United States Patent [19]

Boccardo et al.

[11] 4,352,365

[45] Oct. 5, 1982

[54] PRESSURE VESSEL SAFETY VALVE

[75] Inventors: Hector O. M. Boccardo, Toorak; Thomas W. Jolly, East Reservoir, both of Australia

[73] Assignee: The Commonwealth Industrial Gases Limited, Australia

[21] Appl. No.: 200,631

[22] Filed: Oct. 27, 1980

[30] Foreign Application Priority Data

Nov. 1, 1979 [AU] Australia .............................. PE1165

[51] Int. Cl.$^3$ .............................................. F16K 13/04
[52] U.S. Cl. .................................... 137/68 R; 137/73; 137/74; 220/89 A; 220/89 B
[58] Field of Search ......................... 137/68 R, 73, 74; 220/89 A, 89 B, 374, 363, 364, 207, 204

[56] References Cited

U.S. PATENT DOCUMENTS 2,962,038  11/1960  Bird .................................. 137/68 R

FOREIGN PATENT DOCUMENTS 625083  9/1978  U.S.S.R. ........................... 137/68 R

Primary Examiner—Harold W. Weakley
Attorney, Agent, or Firm—Beveridge, De Grandi & Kline

[57] ABSTRACT

To vent the contents of a pressure vessel upon failure of the vessel due to overheating or to abnormal pressure increase therein, a safety valve defines two passages through it both leading from the vessel interior to atmosphere. One passage is normally obstructed by a fusible member; the other is normally obstructed by a rupturable disc or like member.

3 Claims, 2 Drawing Figures

PRESSURE VESSEL SAFETY VALVE

This invention relates to pressure vessels such as those cylinders in which compressed gases are stored. Such vessels are vulnerable to rupture under certain conditions. For example, if the internal pressure of the vessel contents gets too high; and (quite apart from internal pressure) rupture can occur through deterioration of the metal out of which the cylinder is made due to increasing temperature of that material.

It will be appreciated that a safety valve which opens at a certain blow-off pressure, gives some protection against over-heating of the vessel itself. However, under certain conditions (for example, a partially filled vessel, or one made of a material which undergoes a relatively rapid decay in its tensile strength or other physical property with increasing temperature) a pressure responsive valve may not be sufficient to blow off before the stresses induced in the cylinder exceed the recommended values.

The object of this invention is to provide a safety valve for use with vessels of the kind indicated which will vent the contents of the vessel to atmosphere either in the event of over-pressure in the vessel content or over-high temperature arising in the material of the container itself.

The invention provides a pressure vessel safety valve comprising a plug assembly adapted to be mounted on the vessel in an opening leading to the vessel interior said assembly having ports respectively opening to the vessel interior and to atmosphere; characterised, in that said ports are communicable one with the other by way of two separate passages, and further characterised in that one of said passages is normally obstructed by a first member rupturable in response to a selected pressure arising inside the vessel and the other of said passages is normally obstructed by a second member fusible in response to a selected temperature arising in the material out of which the vessel is made.

An example of the invention is illustrated in the drawings herewith.

Figure 1:
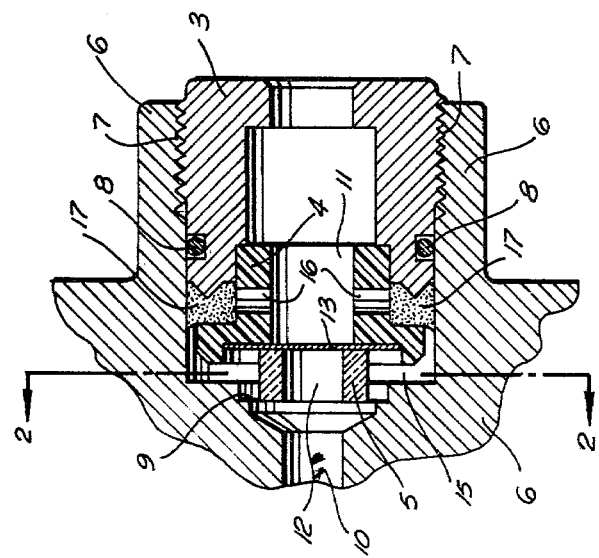
FIG. 1 is a medial section through a safety valve.
Figure 2:
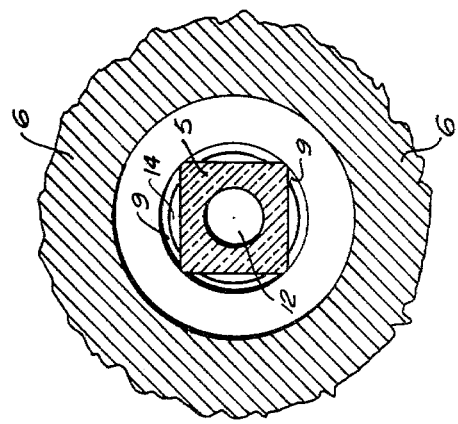
FIG. 2 is an incomplete section taken on line A—A in FIG. 1.

The illustrated valve comprises a plug assembly consisting of a clamping sleeve 3, a mounting ring 4 and a spacer 5. The assembly, as a whole, is adapted to be mounted in relation to an opening in the vessel structure leading to the interior of the vessel. Thus, the opening may be in the vessel wall, or the neck of the vessel, or in the usually provided control valve. In the illustrated arrangement the opening is defined by spigot 6, being a projecting portion of the vessel wall. The clamping sleeve 3 is fluid-tightly mounted in the spigot in any convenient way, for example, by being threaded into the spigot as indicated at 7 and by inclusion between the two of an O-ring as indicated at 8. Sleeve 3 bears against ring 4 so to hold it against spacer 5. The spacer seats against the floor of spigot 6 or a shoulder (9) formed therein. The plug assembly has two parts formed in it, one (10) opening to the vessel interior and the other 11 opening to atmosphere. These two ports are communicable by way of a passage being a hole 12 in the spacer collar 5. This passage during normal usage is obstructed by a rupturable lamina, preferably in the form of a disc, indicated at 13 and clamped between ring 4 and spacer 5. Pressure responsive lamina such as 13 are well-known, as is the calculation of their dimensions appropriate for provision of a required bursting pressure.

A separate passage between ports 11 and 10 is constituted by the spaces 13 (which are present due to the spacer 5 being externally square) annular space 15 and a peripheral array of radial holes indicated at 16. The annular space 15 and the holes 16, or rather the passage space constituted by them, is normally obstructed by a collar of fusible material 17 which for preference, (and as shown) is so placed in relation to the remainder of the plug as to be in direct thermal conductive contact with the metal out of which the vessel is made. The nature of such fusible materials is well-known; moreover, they are readily designed in order to fuse at a required temperature.

We claim:

1. A safety valve for a pressure vessel having an exterior and an interior, said safety valve comprising a plug assembly having a first end and a second end and adapted to be mounted on a vessel in an opening with the plug assembly first end on the vessel interior and the plug assembly second end on the vessel exterior; means defining a first port and a second port in said plug assembly, said first port being in fluid communication with said plug assembly first end and said second port being in fluid communication with said plug assembly second end; means defining a first passage providing fluid communication between said first port and said second port; a first member positioned in said first passage to normally obstruct fluid flow therethrough and rupturable in response to a selected pressure arising inside the vessel to permit fluid flow through said plug assembly via said first passage; means defining a second passage providing fluid communication between said first port and said second port; and a second member positioned in said second passage to normally obstruct fluid flow therethrough and fusible in response to a selected temperature to permit fluid flow through said plug assembly via said second passage.

2. A safety valve according to claim 1 in which said plug assembly comprises an open-ended mounting ring having radial holes therethrough; a rupturable lamina which overlies one end of said ring, and a fusible collar which overlies said radial holes.

3. A safety valve according to claim 2 in which said plug assembly further comprises a spacer collar mounted in the vessel opening and so shaped in relation thereto as to define the entrance ends of said passages and as to hold said lamina against said mounting ring.

* * * * *